United States Patent [19]
Mehdi et al.

[11] Patent Number: 4,616,484
[45] Date of Patent: Oct. 14, 1986

[54] VEHICLE REFRIGERANT HEATING AND COOLING SYSTEM

[75] Inventors: Syed A. Mehdi; William E. Zieske, both of Rockford; David R. Ward, Byron, all of Ill.

[73] Assignee: Kysor Industrial Corporation, Cadillac, Mich.

[21] Appl. No.: 676,679

[22] Filed: Nov. 30, 1984

[51] Int. Cl.⁴ .......................... F25D 17/00; B60H 1/32
[52] U.S. Cl. ..................... 62/180; 62/238.6; 62/243
[58] Field of Search ...................... 62/238.6, 180, 185, 62/238.7, 243, 244, 177, 178, 160, 260, 227, 226, 323.1, 323.4, 324.1, 324.6, 228.1, 228.3; 165/40; 236/93 R

[56] References Cited
U.S. PATENT DOCUMENTS

| | | | |
|---|---|---|---|
| 1,302,938 | 5/1919 | Lippert | 239/93 R |
| 2,801,827 | 8/1957 | Dolza | 257/7 |
| 2,806,358 | 9/1957 | Jacobs | 62/117.1 |
| 3,237,862 | 3/1966 | Salerno et al. | 236/93 R |
| 3,421,339 | 1/1969 | Volk et al. | 62/159 |
| 3,710,587 | 1/1973 | Hayashi | 62/243 X |
| 4,191,023 | 3/1980 | Sisk et al. | 62/79 |
| 4,263,785 | 4/1981 | Barniak et al. | 62/79 |
| 4,293,092 | 10/1981 | Hatz et al. | 237/12.1 |
| 4,295,344 | 10/1981 | Hannett et al. | 62/324.5 |
| 4,351,161 | 9/1982 | Jones | 62/235.1 |
| 4,409,796 | 10/1983 | Fisher | 62/238.6 |
| 4,441,901 | 4/1984 | Endoh | 62/160 |
| 4,523,435 | 6/1985 | Lord | 236/78 D |

*Primary Examiner*—Harry Tanner
*Attorney, Agent, or Firm*—Price, Heneveld, Huizenga & Cooper

[57] ABSTRACT

A refrigerant heating and cooling system for a motor vehicle includes an inside coil, an outside coil, expansion valves, a reversing valve, a refrigerant compressor, a chiller and a control device. The compressor, outside coil, an expansion valve and the inside coil define a first circuit for cooling the air within the vehicle. The compressor, inside coil, an expansion valve and the chiller define a second circuit for heating the interior of the vehicle. The chiller is a refrigerant-to-engine coolant heat exchanger. When in the heating mode, the chiller functions as an evaporator, the inside coil functions as a condenser and the engine coolant system is the heat source. The control device varies the flow of the engine coolant through the chiller as a function of the engine coolant temperature in order to maintain a relatively constant set temperature within the vehicle. In the preferred form, the control device is a microprocessor controlled motor driven valve which senses the engine coolant temperature at the inlet to the chiller, a maximum pressure at the compressor discharge or outlet, the vehicle interior temperature, a set or desired temperature and the outside ambient temperature.

16 Claims, 9 Drawing Figures

VEHICLE REFRIGERANT HEATING AND COOLING SYSTEM

BACKGROUND OF THE INVENTION

The present invention relates to air conditioning or environmental control systems and more particularly to a combined refrigerant heating and cooling system for vehicles.

Generally, automobiles, trucks and the like are ventilated by air forced into the interior by vehicle motion and by a variable speed, electrically driven blower. When heating of the vehicle interior is required, air is passed over a heater core. The core is connected to the engine water jacket and is an air-to-engine coolant heat exchanger. The interior or cabin temperature may be controlled by mixing or blending outside air with the heated air, mixing the heated air with recirculated air, or by a variation of the blower speed.

In order to cool the vehicle interior, a refrigeration air conditioning system is normally used. The system includes an evaporator core disposed in the interior of the vehicle, a refrigerant compressor driven by the vehicle engine, a condenser located in the engine compartment and an expansion valve. Refrigerant is pumped by the compressor through the condenser, expansion valve and the evaporator.

With combined air heating and air cooling systems, dampers and suitable ducts are used to control the proportion of fresh air and recirculated air to the heater core or the evaporator core. The air temperature is normally controlled by an interior thermostat which switches the compressor on and off through a magnetic clutch. Conventional vehicle air conditioning systems also include high and low pressure switches at the compressor discharge and suction to protect the system.

Recent generation engines, and particularly engines employed in trucks, have low flow coolant systems. Due to their low flow, insufficient heating capacity is available using a conventional forced air, heater core system, especially at low ambient temperatures. Conventional heaters suffer from time delay in achieving the desired heater output. Such heaters will not function until the coolant is heated. Coolant temperature varies as a result of different engine operating and vehicle loading conditions.

It has been proposed to use a heat pump for heating and cooling the vehicle interior. A heat pump is a refrigeration system which increases rather than decreases the amount of heat within the vehicle interior. A heat pump uses electrical or chemical energy to raise heat from a lower temperature to a useful level of 100° F. or higher. The heat pump process differs from the more conventional refrigeration process only in that its purpose is to supply rather than extract heat from the interior of the vehicle.

A typical heat pump system includes a compressor, an outside heat exchanger or coil, an inside heat exchanger or coil and an expansion valve. When in the heating mode, the outside coil is an evaporator and ambient air is the heat source. The inside coil functions as a condenser and heats the air circulated over the coil. Conventional air-to-air heat pumps are of limited utility in a vehicle due to the wide range of ambient temperature conditions that may be experienced. At low ambient temperatures, insufficient heat capacity is available to maintain the vehicle interior at a comfortable temperature.

It has been proposed to combine heating and cooling in a refrigeration system for a vehicle wherein the engine coolant is used as the heat source in the heating mode. In such a system, refrigerant is passed by the compressor through an outside condenser and an inside coil which functions as an evaporator when air cooling is desired. When in the heating mode, the refrigerant is passed through a refrigerant-to-engine coolant heat exchanger which functions as an evaporator. The inside coil functions as a condenser. An example of one such system may be found in U.S. Pat. No. 2,801,827 entitled REFRIGERATING APPARATUS and issued on Aug. 6, 1957 to Dolza.

The system disclosed in the Dolza patent includes a refrigerant compressor driven by the vehicle engine through a V-belt and clutch. In the cooling mode, the compressor transfers compressed refrigerant to a condenser located in front of the vehicle, through an expansion valve and through an inside air-to-refrigerant heat exchanger. When in the heating mode, a reversing valve shuts off flow of refrigerant to the condenser. Compressed refrigerant flows through the inside heat exchanger which now serves as a refrigerant condenser. The refrigerant then flows through a line having a pressure regulating valve, an expansion valve, and a refrigerant-to-engine coolant heat exchanger. Coolant from the engine cooling system serves as a heat source in the heating mode. In order to increase the condenser pressure and hence increase the output capacity of the system when in the heating mode, the pressure regulating valve restricts the flow of refrigerant through the system. This results in an increase in the engine horsepower required to drive the compressor which should increase the rate of warm up of the car engine, thereby increasing the rate at which the engine coolant is heated.

Prior systems are not capable of relatively consistent heat output at the condenser side of the system from idling to full operating conditions. Prior approaches have been inefficient and are not capable of providing acceptable performance at the wide range of ambient conditions experienced. A need, therefore, exists for a system which can provide quick heat at engine start up, which is effective at extremely low ambient conditions, such as below minus 21° F., and which permits effective control of the heating capacity of the system.

SUMMARY OF THE INVENTION

In accordance with the present invention, a system is provided by which the aforementioned needs are substantially fulfilled. Essentially, the system includes an inside air-to-refrigerant heat exchanger or coil, an outside air-to-refrigerant heat exchanger or coil, an expansion valve, a reversing valve, a refrigerant compressor, a chiller and a controlling device. The chiller is a refrigerant-to-engine coolant heat exchanger having an inlet and outlet connected to the engine coolant system.

Provision is made for operating the system in a cooling mode wherein refrigerant flows from the compressor to the outside coil, through the expansion valve and through the inside coil with no flow through the chiller. When in the heating mode, provision is made for closing off flow of refrigerant through the outside coil. Refrigerant flows from the compressor to the inside coil which functions as a condenser, through an expansion valve and through the chiller. The output capacity of the system in the heating mode is controlled by varying the flow of the engine coolant through the chiller. Varying of the coolant flow across the chiller permits a relatively constant heat output from the system at widely varying operating conditions and at low ambient temperatures.

In an existing embodiment, the controlling device at the engine coolant inlet to the chiller varies the flow of engine coolant through the chiller as a function of engine coolant temperature. Provision is made for sensing the inlet coolant temperature and deactivating the engine compressor at a predetermined maximum inlet temperature. Provision is also made for sensing the refrigerant pressure at the compressor discharge or outlet, the refrigerant pressure at the compressor suction or inlet, the interior vehicle temperature and the outside ambient temperature. By controlling the flow of coolant through the chiller in response to the sensed conditions and a comparison of the vehicle interior temperature to a set or desired temperature, a relatively constant heat output may be maintained.

DETAILED DESCRIPTION OF THE PREFERRED EMBODIMENT

Figure 1:
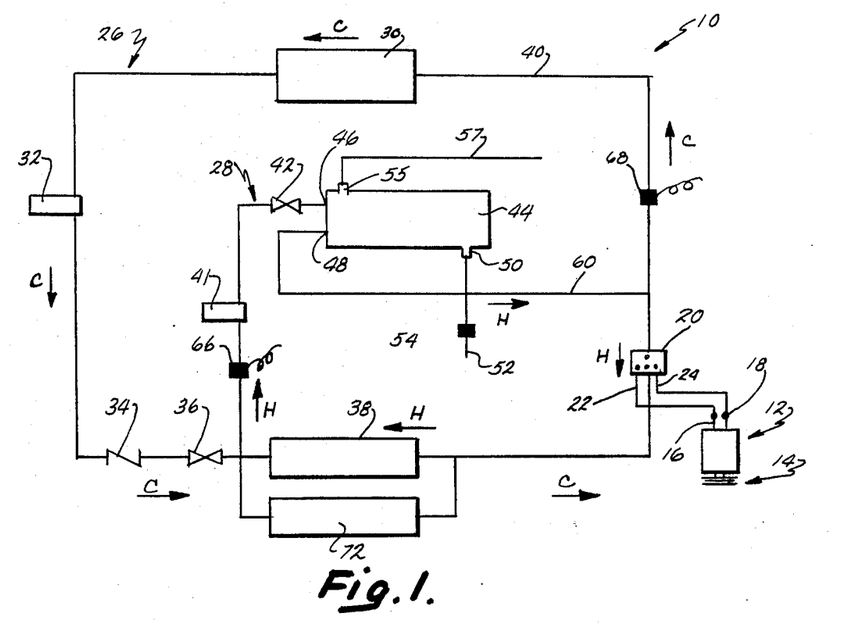
FIG. 1 is a schematic of a combined refrigerant heating and cooling system in accordance with the present invention.

An embodiment of the combined refrigerant heating and cooling system in accordance with the present invention is schematically illustrated in FIG. 1 and generally designated 10. System 10 includes a refrigerant compressor 12 driven in a conventional fashion by the vehicle engine through a clutch and pulley 14. Compressor 12 includes a discharge or outlet 16 and a suction or inlet 18 connected to a four-way reversing valve 20 by suitable lines 22, 24. Reversing valve 20 controls the direction of flow of refrigerant through either an outside or first circuit 26 and inside or second circuit 28. Reversing valve 20 is preferably electrically actuated.

Circuit 26 includes an outside coil or heat exchanger 30, a conventional filter drier 32, a check valve 34, an expansion/block valve 35 and an inside coil or inside air-to-refrigerant heat exchanger 38. The elements of the outer circuit are connected in series by a suitable refrigerant line 40.

Inner circuit 28 includes the inside coil 38, a filter drier 41, another expansion/block valve 42 and a chiller or refrigerant-to-engine coolant heat exchanger 44. Chiller 44 has a refrigerant inlet 46 and a refrigerant outlet 48. Chiller 44 further includes an engine coolant inlet 50 connected to the engine coolant system through a suitable line 52 and an engine coolant outlet 55 which returns engine coolant to the coolant system through a suitable line 57. A controlling device 54 is in line 52. Device 54 is preferably an electrically driven valve which varies the flow of coolant to the chiller as a function of coolant temperature. Inner circuit 28 is connected to the four-way valve 20 by a suitable line 60 and a portion of the refrigerant line 40.

System 10 further includes a first control or solenoid valve 66 disposed within inner circuit 28 downstream of inside coil 38 and a second control or solenoid valve 68 disposed in the outer circuit 26 between outside coil 30 and the four-way valve 20. A check valve may be used in place of solenoid valve 66. System 10 may include a secondary coil 72 in parallel with the inside coil 38. As explained in more detail below, refrigerant would flow through the secondary coil during the heating mode of operation. The secondary coil may be included to obtain the desired heat capacity output for the system when in the heating mode. In the alternative, coil 72 may be in series with coil 38.

Figure 2:
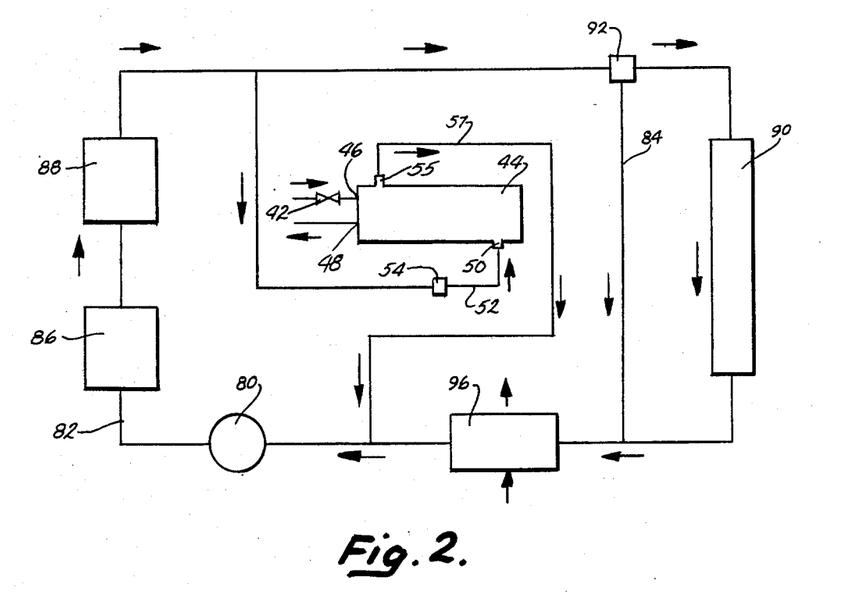
FIG. 2 is a schematic of the engine cooling system and chiller illustrating a connection to the cooling system upstream of the engine coolant system thermostat.

FIG. 2 illustrates an engine coolant system. The system includes a water or coolant pump 80 which circulates coolant through a main line 82 and a bypass line 84. Coolant circulates through an oil cooler 86, the water jacket of an engine 88 and a radiator 90. Coolant thermostat 92 is included upstream of the radiator 90. Until the coolant temperature heats to a predetermined value at which the thermostat 92 opens, coolant passes through the bypass line 84 and back to the pump 80. As shown in FIG. 2, coolant flows to chiller inlet 50 along line 52 from a point upstream of coolant thermostat 92. Coolant is returned to line 82 by return line 57 downstream of the coolant bypass line 84. An air-to-water or air-to-coolant heat exchanger 96 may be included in the coolant line 82 upstream of the point at which the chiller return line 57 joins line 82. Engine intake air may be passed through heat exchanger 96 to reduce intake manifold temperature and hence improve engine efficiency, power and emissions.

Figure 3:
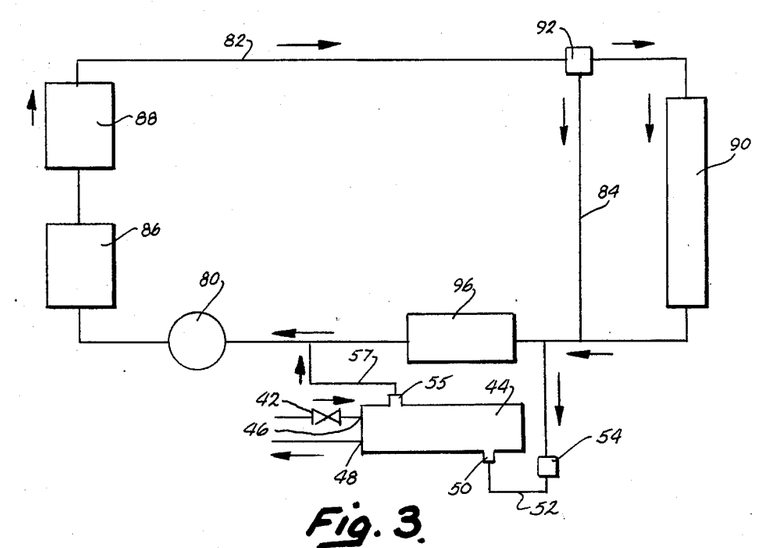
FIG. 3 is a schematic view of the engine cooling system and chiller showing an alternative arrangement wherein the chiller connects to the engine coolant system downstream of the coolant system thermostat.

FIG. 3 illustrates an alternative arrangement for tapping the engine coolant system. In FIG. 3, intake line 52 to chiller 44 taps coolant line 82 downstream of the thermostat bypass line 84. Return line 57 merges with line 82 between air-to-water heat exchanger 96 and engine coolant pump 80. Various other alternatives are possible for tapping the engine coolant system to provide coolant to the chiller of the refrigerant system. Selection from the alternatives depends upon the type of engine, the size and design of the engine coolant system and the specific capacities of the heating and cooling system.

OPERATION

To place the system in the cooling mode, solenoid valve 66 is closed, solenoid valve 68 is opened and four-way valve 20 is actuated so that compressed refrigerant will flow through outer circuit 26 in the direction of arrows C. Reverse flow through inner circuit 28 is prevented by control valve 66. Check valve 34 permits coolant flow only in the direction of arrows C.

A suitable control system, such as the one described in more detail below, is used to actuate the solenoid valves 66, 68 and the reversing valve 20 to place the system in the cooling mode. In addition, a high pressure switch (not shown) is preferably included, in a conventional fashion, at the compressor discharge or outlet 16 and a low pressure switch (not shown) is included at the compressor suction or inlet 18. In the cooling mode, actual vehicle interior or cabin temperature is compared with a desired or set temperature to control actuation of compressor clutch 14. When in the cooling mode, compressor 12 will compress refrigerant and transfer it through the outside coil 30 which functions as a condenser. Refrigerant within the coil 30 will condense and give up heat to the air passing over the coil. The refrigerant will then pass through filter drier 32 which removes moisture in a conventional fashion and through the expansion/block valve 36. Valve 36 meters refrigerant into the evaporator or inside coil 38. Interior air is forced in heat exchange relationship with the refrigerant at coil 38. Heat is removed from the air and the refrigerant is vaporized. Refrigerant then passes to the compressor suction inlet 18. The high pressure switch (not shown) at the compressor senses a high pressure condition and shuts down the system. Similarly, should a low pressure condition exist, such as one which would result from a leak in the system, the conventional low pressure switch would shut down the compressor.

To place the system into the heating mode, valve 66 is opened, valve 68 is closed and reversing valve 20 is positioned so that refrigerant from compressor 12 passes through the inner circuit 28 in the direction of the arrows H. When in this mode of operation, inside coil 38 functions as a condenser and chiller 44 functions as an evaporator. Compressed refrigerant passes through inside coil 38, through filter drier 41 and through expansion/block valve 42. Valve 42 meters refrigerant into chiller 44 where it will pass in heat exchange relationship with engine coolant. The coolant acts as a heat source to evaporate the refrigerant. The evaporated refrigerant passes to the compressor suction inlet.

The heating capacity or output of the system, while in the heating mode, is controlled by the device 54. Device 54 is preferably an electrically actuated valve capable of varying the flow of coolant to chiller inlet 50. By increasing coolant flow through chiller 44, the cooling capacity of that heat exchanger is increased. In other words, more heat is transferred to the refrigerant. This increases the condenser capacity of inside coil 38 and hence the heat output of the system. Similarly, decreasing coolant flow through chiller 44 will decrease the heat output or capacity of inside coil 38.

Figure 4:
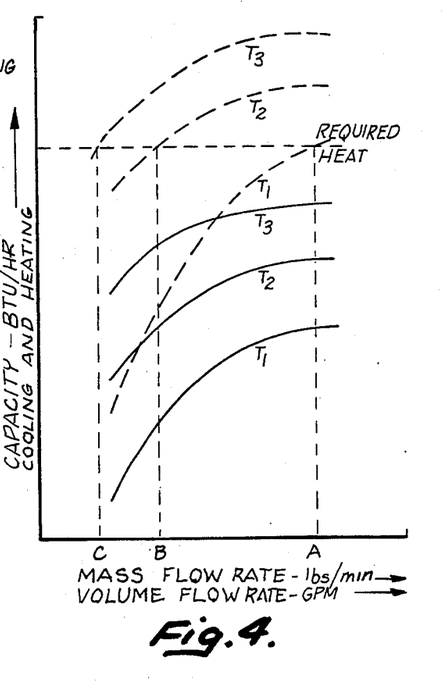
FIG. 4 is a graph of system capacity in BTU's per hour versus coolant flow rate at various chiller water inlet temperatures.

Typical performance curves for the system at various coolant inlet temperatures are illustrated in FIG. 4. FIG. 4 is a graph of condenser capacity and evaporator capacity per hour as a function of mass flow rate or volume rate of coolant through chiller 44 at various coolant inlet temperatures. The condenser capacity is graphed in broken lines and the evaporator capacity of chiller 44 is shown in solid lines. These capacities are plotted at various coolant inlet temperatures with temperature $T_3$ being greater than temperature $T_2$ which is greater than temperature $T_1$. In order to obtain the desired or required heat in the interior of the vehicle, the flow rate of coolant through the chiller is varied. At an initial temperature $T_1$, which would be a low coolant temperature, the maximum allowable coolant flow across the chiller is maintained. This speeds up the process for the system to reach its required heating capacity. With a flow rate of "a" at temperature $T_1$, the condenser capacity or heating capacity of the system is at the required value. As the coolant temperature rises due to engine operation from $T_1$ through $T_2$ to $T_3$, coolant flow is reduced to points "b" and "c". At the higher coolant temperature, the reduced flow rate provides the required heat capacity.

Various control systems could be used to automatically control the opening and closing of device 54. With the control system shown in FIGS. 6a–6d, controlling device 54 opens and closes based upon fixed input parameters for the particular system. The temperature of the coolant at the inlet 50 to chiller 44 determines the percentage opening of device 54 at system start up in the heating mode. Minimum and maximum inlet coolant temperatures are set for the system to energize and deenergize the compressor clutch. When the maximum inlet coolant temperature is achieved, the clutch 14 of the compressor would be deenergized. As discussed below in connection with FIG. 6(c), the system includes a maximum allowable or high pressure switch, a low pressure switch and a heat mode, pressure limit switch. The high and low pressure switches set the maximum discharge pressure and minimum suction pressure to energize and de-energize the compressor clutch. When system pressure equals or exceeds the set point of the pressure limit switch, the percentage opening of the valve device 54 is reduced to decrease coolant flow across the chiller. This maintains the average set high pressure limit by reducing system pressure. If the pressure drops below the minimum or low pressure limit, the clutch is de-energized and the system is shut down in a conventional fashion. The control system for device 54 checks vehicle interior actual temperature against the desired or set temperature selected by the vehicle operator. If the actual temperature is less than the set temperature, the system controls the valve of device 54 based upon the high pressure limit predetermined by the high pressure switch at the compressor. When the actual vehicle interior temperature equals or exceeds the set or desired temperature, the set temperature would then become the controlling factor to regulate the position of the valve of device 54 and hence the amount of coolant flowing through the chiller to maintain the interior temperature at the set temperature.

Figure 5:
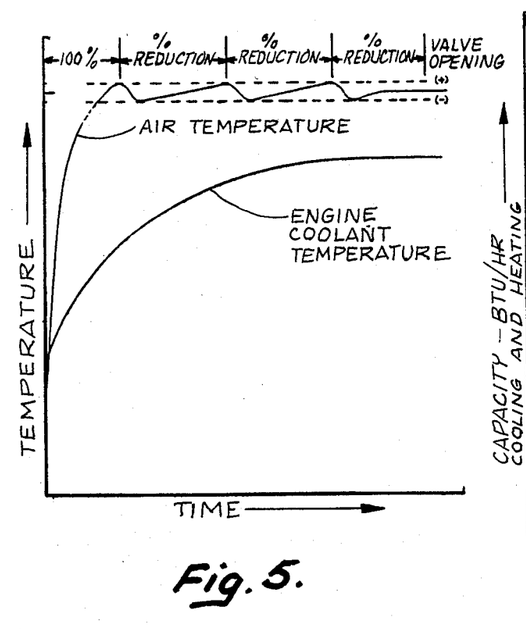
FIG. 5 is a graph of the conditioned air temperature and engine coolant temperature as function of time showing a typical performance curve at low ambient temperature.

FIG. 5 is a graph of the temperature of the conditioned air in the vehicle heating ducts and of engine coolant temperature as a function of time. At point 0 or initial start up, engine coolant temperature is low and the valve of device 54 is 100% open to achieve a relatively rapid increase in vehicle interior temperature until a maximum "+" value above the preset value is reached. At this point, the percent opening of the valve would be decreased until the temperature of the air in the duct is reduced to a predetermined minimum "−" value below the preset value. By reducing the percent opening of the valve of device 54, coolant flow across the chiller is reduced to maintain an average set or desired temperature.

The system is capable of maintaining the required or desired interior vehicle temperature consistently from idle to full operating conditions at a wide range of ambient temperatures. The system is capable of effective operation at extreme low ambient temperatures, such as below minus 21° F. The system readily responds to engine operation which would cause a change in coolant temperature, such as low idle, high idle, light loads, heavy loads and normal operating conditions for the engine. The system provides relatively fast response times and overcomes the insufficient heat problems experienced with low coolant flow, conventional heater core forced air heater systems. The system may be relatively easily incorporated into a vehicle as original equipment or as an after-market item.

CONTROL SYSTEM

In the automatic control system shown in FIGS. 6a–6d, the valve of device 54 is motor driven and is stepped open and closed in response to sensed coolant inlet temperature, compressor discharge pressure, the cab or interior vehicle temperature, and ambient temperature. The cab temperature is compared to a preset or desired temperature. The control system actuates solenoid valves 66, 68 and a solenoid to drive four-way valve 20 and configure the system for cooling or heating as desired by the vehicle operator. The control system is a microprocessor based controller which uses CMOS technology. Basically, the system includes a microprocessor, such as an RCA 1800 Series microprocessor, a program memory and the necessary input and output circuits. The system monitors the vital parameters mentioned above required for proper system operation and makes the adjustments necessary to achieve safe operation and the desired output as set at an operator control panel.

Figure 6A:
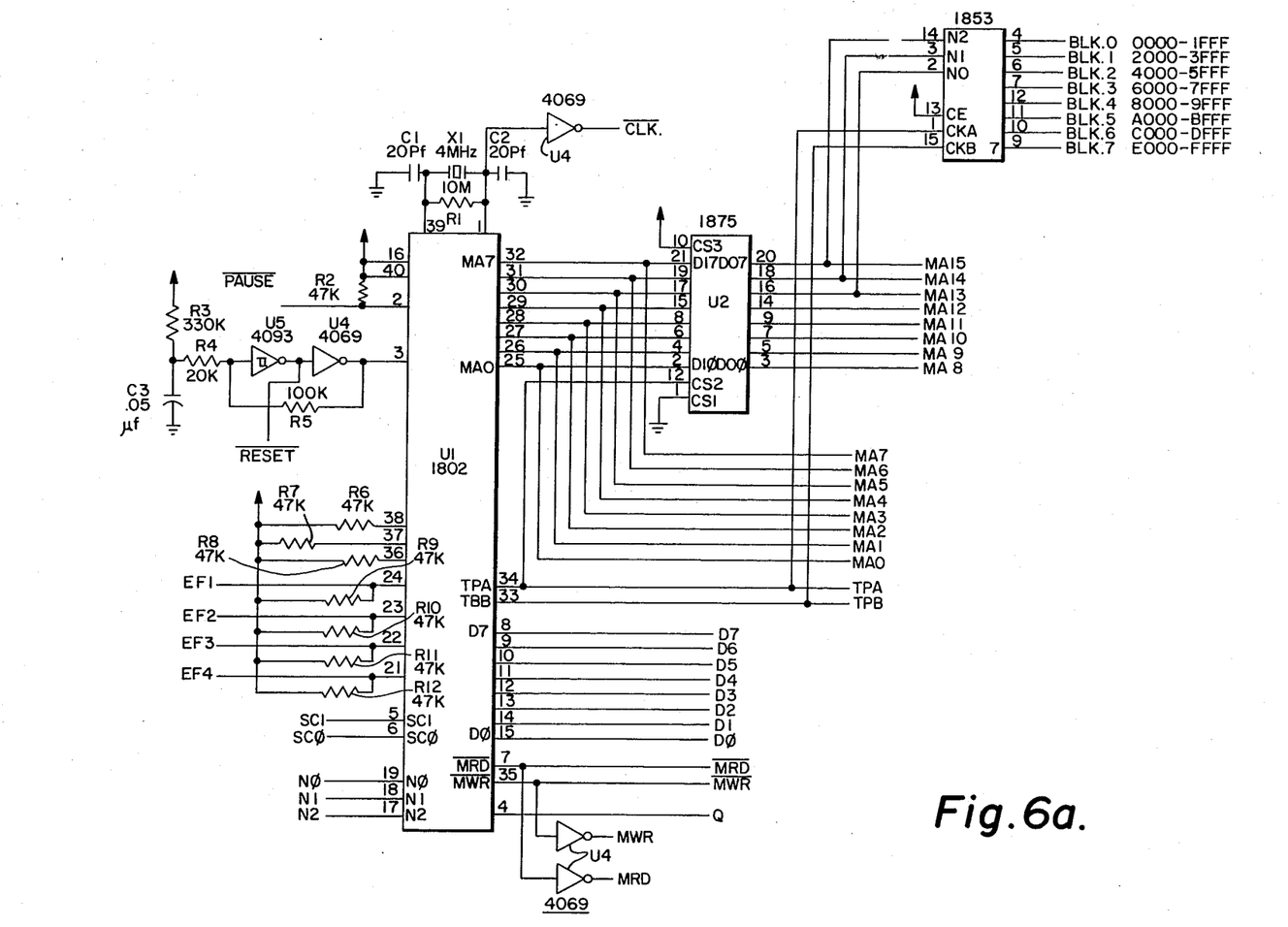
FIGS. 6a–6d are schematics of a control system for use with the combined refrigerant heating and cooling system in accordance with the present invention.

The microprocessor is designated U1. The processor may operate at a clock frequency of up to 5 MHz. One-sixth of the capacity of a chip designated U4 serves as a clock buffer. This buffer can be utilized by the system in other applications as may be required. Chip U2 is an upper address latch. This latch receives and holds memory address bits MA8 to MA15. Chip U3 is an 8 to 1 demultiplexer. Chip U3 decodes the upper three memory address bits MA13 to MA15 into one of eight unique active high signals. One-third of the capacity of chip U4 provides inverted memory read and write signals which are used by the system. One-sixth of the capacity of chip U4 and one-fourth of the capacity of chip U5 constitute a reset circuit which holds its electrical state for approximately 15 milliseconds after electricity is first applied to the system.

The program memory (FIG. 6b) is a read only memory (ROM) chip designated U6 which can be from 2048 bytes to 8192 bytes in size. This memory resides in block 0. It is selected when the address bits MA13–MA15 are 000 (binary). One-sixth of the capacity of U4 provides appropriate signal levels for chip U6. Chips U8 and U9 buffer data and provide isolation between the memory chips and the processor data bus. Eight 47K resistors (not shown) are included to make the high level output from the memory data line compatible with the CMOS input.

Figure 6B:
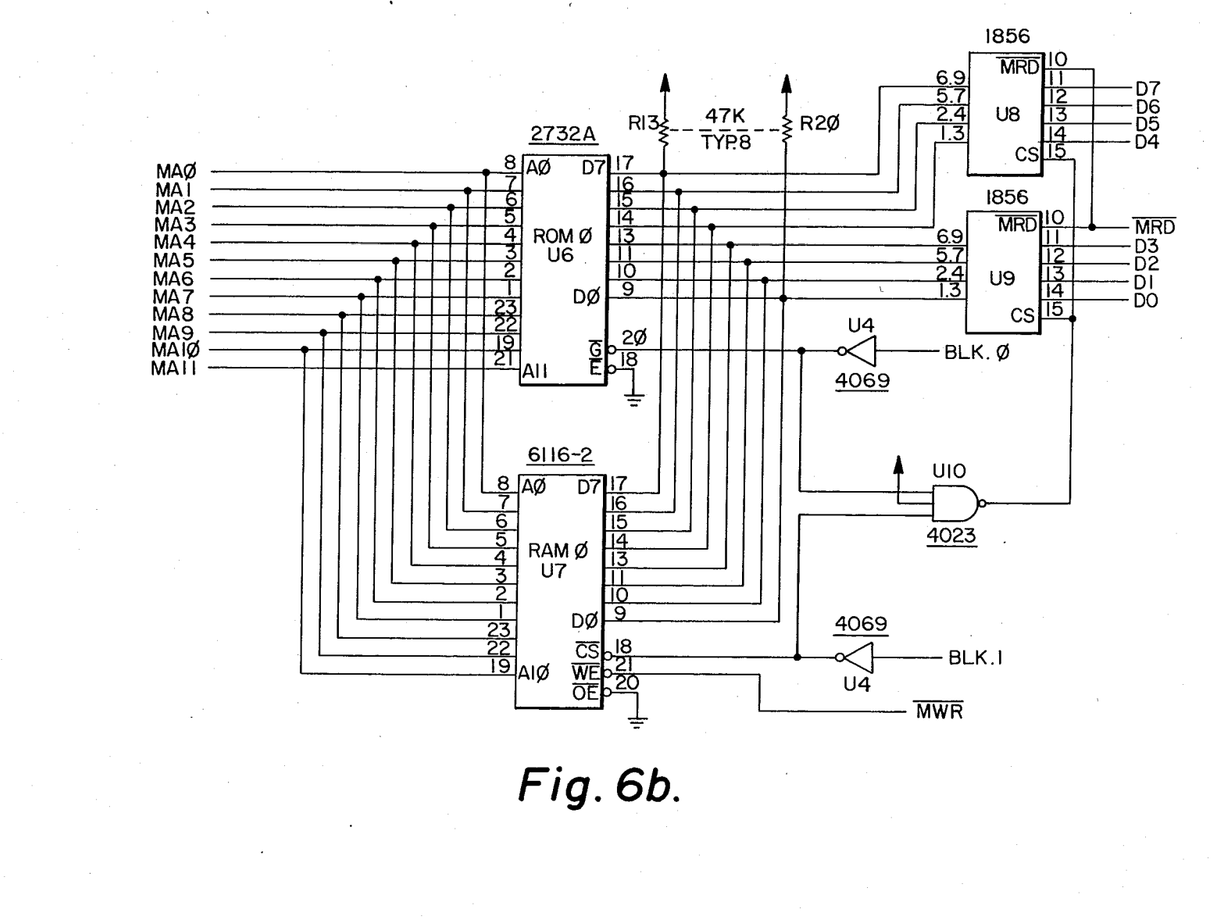

Chip U7 is the random access memory, or RAM, of the system. Chip U7 holds temporary data. It resides at block 1 of the system and is selected when the address bits MA13–MA15 are 001 (binary).

Figure 6C:
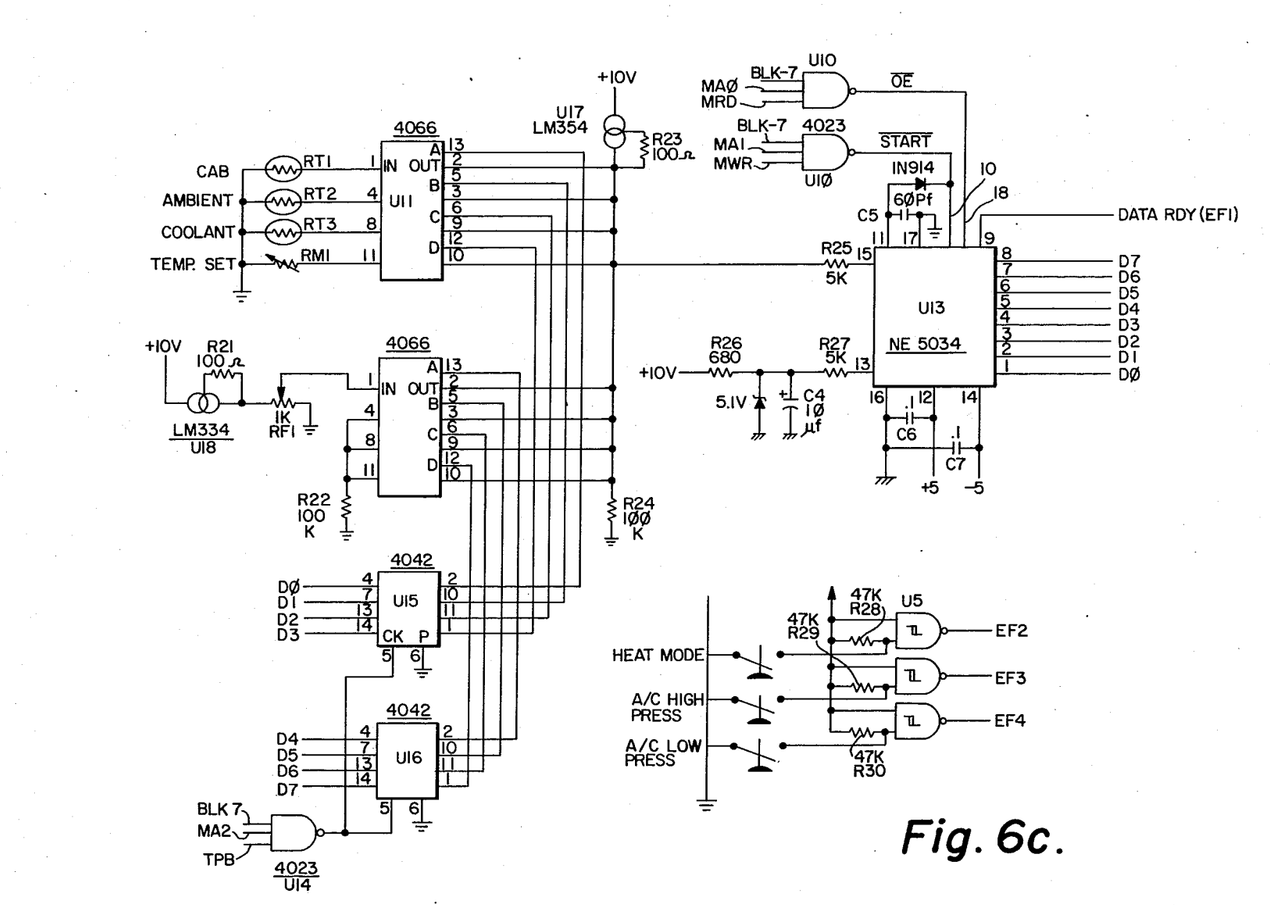
Figure 6D:
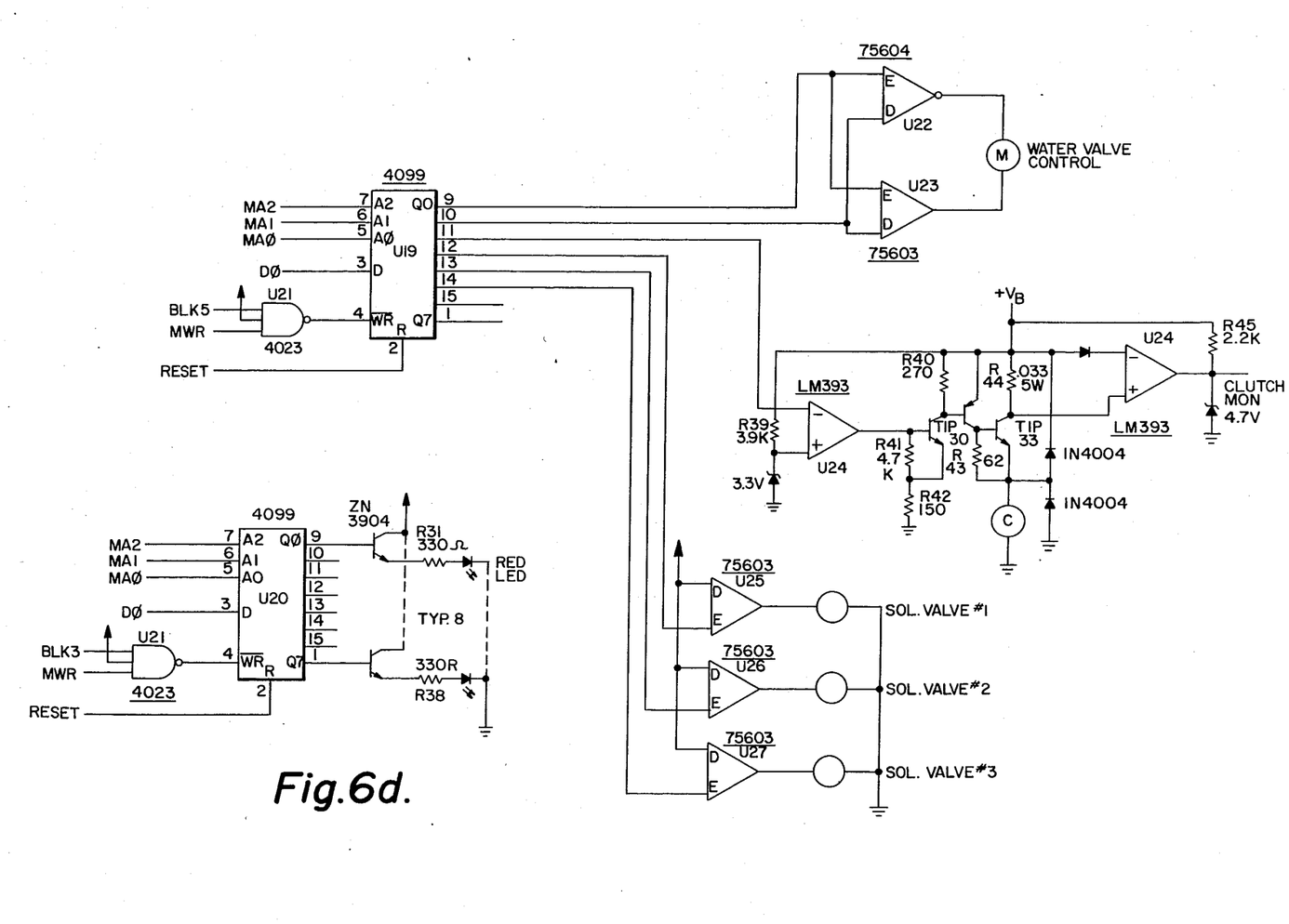

Block 3 is a monitor default display (FIG. 6d). Chip U20 is an addressable latch. Any of the eight default indicators can be caused to light light emitting diodes as conditions warrant.

The output section (FIG. 6d) resides in block 5 of the system. This section controls movement of the motor driven valve included in controlling device 54, the compressor clutch, and the solenoid valves for configuring the system in the cooling or heating mode. Chip U19 is an eight bit addressable latch. The processor can address and write individual bits at chip U19 to turn the various components on and off. One-third of the capacity of chip U21 is used to gate the appropriate signals to chip U19. Chips U22 and U23 are complementary "Half-H" drivers or amplifiers with a D input specifying direction of motor rotation and an E input for enabling the chip outputs to the motor of the water valve control included in device 54. This arrangement allows the valve of control 54 to be "stepped" open or closed by pulsing the motor for a selected duration.

As shown in FIG. 6d, the compressor clutch is controlled by a suitable switching circuit with over-current protection (FIG. 6d). Should the clutch draw excessive current, the microprocessor would deenergize the clutch and light a default light to warn of this condition.

Amplifiers U25, U26 and U27 are "Half-H" drivers which control the solenoid valves of the system (FIG. 6d). These valves correspond to valves 66, 68 and the four-way valve 20 and configure the system to function either in the heating mode or in the cooling mode.

Three-fourths of the capacity of chip U5 is used to buffer the three pressure switch inputs used to monitor the system pressure (FIG. 6c). Conventional high and low pressure switches for use in the air conditioning mode are included. The high pressure switch designated "heat mode" is the previously mentioned heat mode, pressure limit switch. When the refrigerant system pressure exceeds the setting of that switch, the valve of device 54 is closed incrementally to reduce water flow and hence lower system pressure.

Two-thirds of the capacity of chip U10, chips U11 and U12, one-third of the capacity of chip U14, and chips U15 and U16 including associated resistors make up the analog input section of the controller (FIG. 6c). Chips U11 and U12 are quad bilateral switches. The various inputs can be selected by writing a binary 1 into the associated register and chips U15 or U16. Thermistors RT1, RT2 and RT3 monitor the temperature of the vehicle cab or interior, the outside ambient temperature and the coolant temperature going into the chiller. A potentiometer designated RM1 is set by the operator to select the desired or set cabin temperature. Current source devices designated U17 and U18 are provided for the analog devices. A precision feedback potentiometer RP1 is coupled to the valve of controller 54 to determine the position of the valve. Chip U13 is a successive approximation type analog to digital converter.

The above described control system is preferably used when there is a possibility of a high head pressure build up at the compressor outlet in the system. The possibility of such a condition will depend, of course, on the specific capacities designed into the system. The device includes sensors to determine inside vehicle or cab temperature and a pressure sensor to measure or determine the pressure build up at the compressor outlet or discharge. The microprocessor technology permits ready entry of different points for coolant flow rate with respect to various coolant inlet temperatures. In the alternative, where head pressure build up at the compressor outlet is not a concern, circuitry which merely senses the temperature of the air leaving the inside coil and/or the coolant inlet temperature to the chiller may be used to regulate coolant flow.

The combined refrigerant cooling and heating system in accordance with the present invention has the ability to provide essentially instant heat at engine start up. This is a significant advantage over the typical inadequate heat available from engine coolant in a conventional heater core/forced air heating system. The system is free from ice problems since heat is available from the coolant. System operation is extremely effective even at low ambient temperatures since adequate heat is available from the engine coolant. The heating capacity of the system is readily controlled by regulating the flow of the coolant through the chiller. The system can readily accommodate the wide range of ambient conditions which might be experienced in a single day by an over-the-road vehicle, such as a semi-trailer tractor. A long distance truck could experience low ambient temperatures and high ambient temperatures in the same day.

In view of the foregoing description, those of ordinary skill in the art will undoubtedly envision various modifications which would not depart from the inventive concepts disclosed herein. It is therefore intended that the above description should be considered as only that of the preferred embodiment. The true spirit and scope of the present invention may be determined by reference to the appended claims.

The embodiments of the invention in which an exclusive property or privilege is claimed are defined as follows:

1. A heat pump for heating a vehicle interior, said heat pump comprising:
   a refrigerant compressor;
   an inside coil connected to said compressor;
   an expansion valve connected to said coil;
   a heat exchanger connected to said expansion valve, said heat exchanger including an engine fluid heat source inlet and an engine fluid heat source outlet;
   valve means connected to said fluid heat source inlet for controlling the flow of fluid to said heat exchanger and hence the output capacity of said inside coil; and
   control means operatively connected to said valve means for controlling said valve means as a function of coolant temperature, vehicle interior temperature and a desired temperature so that said control means closes said valve means to reduce the flow of fluid at said engine fluid heat source inlet when said vehicle interior temperature exceeds said desired temperature.

2. A heat pump as defined by claim 1 wherein said fluid heat source is engine coolant.

3. A heat pump as defined by claim 2 wherein said control means senses coolant temperature, a maximum compressor discharge pressure and vehicle interior temperature.

4. A heat pump as defined by claim 3 wherein said control means deactivates said compressor when a predetermined maximum coolant temperature is sensed.

5. A heat pump as defined by claim 4 wherein said control means closes said valve means when the compressor discharge pressure exceeds said maximum compressor discharge pressure.

6. A heat pump for heating a vehicle interior, said heat pump comprising:
   a refrigerant compressor;
   an inside coil connected to said compressor;
   an expansion valve connected to said coil;
   a heat exchanger connected to said expansion valve, said heat exchanger including an engine fluid heat source inlet and an engine fluid heat source outlet; and
   valve means connected to said fluid heat source inlet for controlling the flow of fluid to said heat exchanger and hence the output capacity of said inside coil, said fluid heat source being engine coolant and said heat pump further including a control means operatively connected to said valve means for controlling said valve means as a function of coolant temperature, said control means sensing coolant temperature, a maximum compressor discharge pressure and vehicle interior temperature, said control means deactivating said compressor when a predetermined maximum coolant temperature is sensed, said control means closing said valve means when the compressor discharge pressure exceeds said maximum compressor discharge pressure, and wherein said control means includes means for comparing vehicle interior temperature to a desired temperature and said control means closes said valve means when said vehicle interior temperature exceeds said desired temperature.

7. A vehicle air conditioning system including a refrigerant for heating and cooling the vehicle interior, said system comprising:
   an inside coil disposed within the vehicle interior and functioning as an evaporator in the cooling mode and a condenser in the heating mode;
   an outside coil disposed outside of the vehicle interior and functioning as a condenser in the cooling mode;
   a first expansion valve disposed between said inside coil and said outside coil;
   a reversing valve;
   a refrigerant compressor connected to said reversing valve;
   a heat exchanger adapted to be connected to a liquid heat source of a vehicle engine for passing liquid in heat exchange relationship with the refrigerant;
   a second expansion valve between said heat exchanger and said inside coil, said inside coil, outside coil, first expansion valve and compressor defining a first circuit when said reversing valve is in a cooling mode and said inside coil, second expansion valve, heat exchanger and compressor defining a second circuit when said reversing valve is in a heating mode;
   valve means between said inside coil, said heat exchanger and said outside coil for permitting refrigerant flow from said compressor to said outside coil, said first expansion valve and said inside coil when in the cooling mode and from said compressor to said inside coil, said second expansion valve and said heat exchanger when in the heating mode; and
   control means connected to said heat exchanger for controlling the flow of liquid in heat exchange relationship with said refrigerant as a function of liquid temperature when said reversing valve is in said heating mode to maintain a relatively constant temperature within the interior of said vehicle, said control means including means for sensing said liquid temperature and means for sensing vehicle interior temperature, said control means reducing the flow of liquid when said interior temperature exceeds a desired vehicle interior temperature.

8. A vehicle air conditioning system as defined by claim 7 wherein said heat exchanger is a chiller, said heat source is the cooling system of said engine and the liquid is engine coolant and wherein said valve means comprises a first solenoid valve between said inside coil and said chiller and a second solenoid valve between said outside coil and said reversing valve.

9. A vehicle air conditioning system as defined by claim 7 further including a check valve between said inside coil and said outside coil to prevent flow of refrigerant to said outside coil when said system is in said heating mode.

10. A vehicle air conditioning system including a refrigerant for heating and cooling the vehicle interior, said system comprising:
- an inside coil disposed within the vehicle interior and functioning as an evaporator in the cooling mode and a condenser in the heating mode;
- an outside coil disposed outside of the vehicle interior and functioning as a condenser in the cooling mode;
- a first expansion valve disposed between said inside coil and said outside coil;
- a reversing valve;
- a refrigerant compressor connected to said reversing valve;
- a heat exchanger adapted to be connected to a liquid heat source of a vehicle engine for passing liquid in heat exchange relationship with refrigerant;
- a second expansion valve between said heat exchanger and said inside coil, said inside coil, outside coil, first expansion valve and compressor defining a first circuit when said reversing valve is in a cooling mode and said inside coil, second expansion valve, heat exchanger and compressor defining a second circuit when said reversing valve is in a heating mode;
- valve means between said inside coil, said heat exchanger and said surface coil for permitting refrigerant flow from said compressor to said outside coil, said first expansion valve and said inside coil when in the cooling mode and from said compressor to said inside coil, said second expansion valve and said heat exchanger when in the heating mode;
- control means connected to said heat exchanger for controlling the flow of liquid in heat exchange relationship with said refrigerant as a function of liquid temperature when said reversing valve is in said heating mode to maintain a relatively constant temperature within the interior of said vehicle; and
- a secondary coil connected to said compressor and said expansion valve, said secondary coil being part of said second circuit when said reversing valve is in said heating mode.

11. A vehicle air conditioning system including a refrigerant for heating and cooling the vehicle interior, said system comprising:
- an inside coil disposed within the vehicle interior and functioning as an evaporator in the cooling mode and a condenser in the heating mode;
- an outside coil disposed outside of the vehicle interior and functioning as a condenser in the cooling mode;
- a first expansion valve disposed between said inside coil and said outside coil;
- a reversing valve;
- a refrigerant compressor connected to said reversing valve;
- a heat exchanger adapted to be connected to a liquid heat source of a vehicle engine for passing liquid in heat exchange relationship with the refrigerant;
- a second expansion valve between said heat exchanger and said inside coil, said inside coil, outside coil, first expansion valve and compressor defining a first circuit when said reversing valve is in a cooling mode and said inside coil, second expansion valve, heat exchanger and compressor defining a second circuit when said reversing valve is in a heating mode;
- valve means between said inside coil, said heat exchanger and said outside coil for permitting refrigerant flow from said compressor to said outside coil, said first expansion valve and said inside coil when in the cooling mode and from said compressor to said inside coil, said second expansion valve and said heat exchanger when in the heating mode;
- control means connected to said heat exchanger for controlling the flow of liquid in heat exchange relationship with said refrigerant as a function of liquid temperature when said reversing valve is in said heating mode to maintain a relatively constant temperature within the interior of said vehicle, wherein said heat exchanger is a chiller, said heat source is the cooling system of said engine and the liquid is engine coolant and wherein said valve means comprises a first solenoid valve between said inside coil and said chiller and a second solenoid valve between said outside coil and said reversing valve; and
- a secondary coil connected to said compressor and said second expansion valve, said secondary coil being part of said second circuit when said reversing valve is in said heating mode.

12. A refrigerant heating and cooling system for a vehicle having an engine cooling system including a coolant pump, a thermostat and a radiator, said heating and cooling system comprising:
- an air-to-refrigerant inside coil which functions as an evaporator in a cooling mode and a condenser in a heating mode;
- an air-to-refrigerant outside coil which functions as a condenser in the cooling mode;
- a refrigerant-to-coolant chiller having an engine coolant inlet and outlet connectable to the engine cooling system;
- a refrigerant compressor having a suction inlet and a discharge outlet;
- a reversing valve connected to said compressor inlet and outlet;
- a first expansion valve disposed between said outside coil and said inside coil;
- a second expansion valve disposed between said chiller and said inside coil;
- valve means for defining a first cooling circuit including said compressor, said outside coil, said first expansion valve and said inside coil so that when said reversing valve is in a first position, refrigerant will flow from said compressor discharge to said outside coil to said first expansion valve, to said inside coil and to said suction inlet and for defining a second heating circuit so that when said reversing valve is in a second position, refrigerant will flow from said compressor discharge to said inside coil to said expansion valve to said chiller in heat exchange relationship with the engine coolant and to said compressor suction inlet; and
- control means at said chiller coolant inlet for varying the flow of coolant in heat exchange relationship with said refrigerant as a function of coolant temperature and for controlling the operation of said compressor when the reversing valve is in the second position to achieve and maintain a desired temperature within the vehicle, said control means including means for sensing vehicle interior temperature, coolant temperature and a maximum compressor discharge pressure, said control means deactivating said compressor when coolant inlet temperature to the chiller exceeds a predetermined maximum value and wherein said control means reduces the flow of coolant at said chiller coolant inlet when the vehicle interior temperature exceeds the desired temperature.

13. A refrigerant heating and cooling system as defined by claim 12 wherein said control means includes a motor driven valve.

14. A refrigerant heating and cooling system for a vehicle having an engine cooling system including a coolant pump, a thermostat and a radiator, said heating and cooling system comprising:
- an air-to-refrigerant inside coil which functions as an evaporator in a cooling mode and a condenser in a heating mode;
- an air-to-refrigerant outside coil which functions as a condenser in the cooling mode;
- a refrigerant-to-coolant chiller having an engine coolant inlet and outlet connectable to the engine cooling system;
- a refrigerant compressor having a suction inlet and a discharge outlet;
- a reversing valve connected to said compressor inlet and outlet;
- a first expansion valve disposed between said outside coil and said inside coil;
- a second expansion valve disposed between said chiller and said inside coil;
- valve means for defining a first cooling circuit including said compressor, said outside coil, said first expansion valve and said inside coil so that when said reversing valve is in a first position, refrigerant will flow from said compressor discharge to said outside coil to said first expansion valve, to said inside coil and to said suction inlet and for defining a second heating circuit so that when said reversing valve is in a second position, refrigerant will flow from said compressor discharge to said inside coil to said second expansion valve to said chiller in heat exchange relationship with the engine coolant and to said compressor suction inlet; and
- control means at said chiller coolant inlet for varying the flow of coolant in heat exchange relationship with said refrigerant as a function of coolant temperature and for controlling the operation of said compressor when the reversing valve is in the second position to achieve and maintain a desired temperature within the vehicle, said control means including a motor driven valve, means for sensing vehicle interior temperature, coolant temperature and a maximum compressor discharge pressure, said control means further including means for deactivating the compressor when coolant temperature to the chiller exceeds a predetermined maximum value.

15. A refrigerant heating and cooling system as defined by claim 14 wherein said control means includes means for closing said motor driven valve to reduce coolant flow and hence reduce refrigerant pressure when compressor discharge pressure exceeds the maximum discharge pressure.

16. A refrigerant heating and cooling system as defined by claim 14 wherein said control means includes means for comparing vehicle interior temperature to a desired temperature and for closing said motor driven valve when said interior temperature exceeds said desired temperature.

* * * * *